United States Patent [19]

Schrock

[11] Patent Number: 4,648,123
[45] Date of Patent: * Mar. 3, 1987

[54] REMOTE LEVEL MEASUREMENT SYSTEM FOR USE IN A MULTI-TERMINAL COMMUNICATIONS SYSTEM

[75] Inventor: Clifford B. Schrock, Aloha, Oreg.

[73] Assignee: C-Cor Labs, Inc., State College, Pa.

[*] Notice: The portion of the term of this patent subsequent to Apr. 16, 2002 has been disclaimed.

[21] Appl. No.: 690,394

[22] Filed: Jan. 8, 1985

Related U.S. Application Data

[63] Continuation of Ser. No. 445,167, Nov. 29, 1982, Pat. No. 4,512,033.

[51] Int. Cl.$^4$ .................. H04B 17/00; H04H 1/00
[52] U.S. Cl. .......................... 455/67; 455/4; 455/5; 455/69; 358/86; 340/825.54
[58] Field of Search .......................... 455/2-6, 455/67, 68, 69; 358/84, 86; 340/825.06, 825.3, 825.54; 179/170 F, 170.8

[56] References Cited

U.S. PATENT DOCUMENTS

| | | |
|---|---|---|
| 2,434,155 | 1/1948 | Haynes . |
| 2,678,998 | 5/1954 | Young, Jr. . |
| 3,064,195 | 11/1962 | Freen . |
| 3,278,850 | 10/1966 | Tomizawa et al. . |
| 3,315,164 | 4/1967 | Ferguson, Jr. et al. . |
| 3,665,461 | 5/1972 | Gnagi et al. . |
| 3,684,823 | 8/1972 | McVoy . |
| 3,697,984 | 10/1972 | Atkinson et al. . |
| 3,732,496 | 5/1973 | Boyer . |
| 3,750,022 | 7/1973 | Curry et al. .................. 455/5 |
| 3,806,814 | 4/1974 | Forbes .................. 455/5 |
| 3,846,703 | 11/1974 | Stewart et al. . |
| 3,886,454 | 5/1975 | Oakley et al. . |
| 3,925,782 | 12/1975 | Anderl et al. .................. 455/69 |
| 4,205,269 | 5/1980 | Watanabe . |
| 4,245,245 | 1/1981 | Matsumoto et al. .................. 358/84 |
| 4,261,054 | 4/1981 | Scharla-Nielson . |
| 4,281,260 | 7/1981 | Moegen et al. . |
| 4,319,184 | 3/1982 | Kowalczyk . |
| 4,322,854 | 3/1982 | Bundens et al. .................. 455/5 |
| 4,343,042 | 8/1982 | Schrock et al. . |
| 4,347,604 | 8/1982 | Saito et al. .................. 455/2 |
| 4,365,249 | 12/1982 | Tabata .................. 455/2 |
| 4,408,345 | 10/1983 | Yashiro .................. 455/3 |
| 4,558,358 | 12/1985 | Onda .................. 455/5 |

FOREIGN PATENT DOCUMENTS 2037543  7/1980  United Kingdom .

Primary Examiner—Jin F. Ng
Attorney, Agent, or Firm—William A. Birdwell

[57] ABSTRACT

A remote level measurement system for use in a multi-terminal communications system wherein a plurality of remote terminals are connected to a master terminal by a distribution network for bi-directional transmission of signals. The remote terminals are adapted to receive and transmit signals on the network. work. The master terminal is adapted to transmit an interrogation signal to a selected remote terminal and wait for a period of time sufficient for the interrogation signal to be transmitted to, and detected by, a selected remote terminal and a reply signal to be sent back to the master terminal by the remote terminal. At the expiration of that time the master terminal samples and measures the analog level of the reply signal.

3 Claims, 9 Drawing Figures

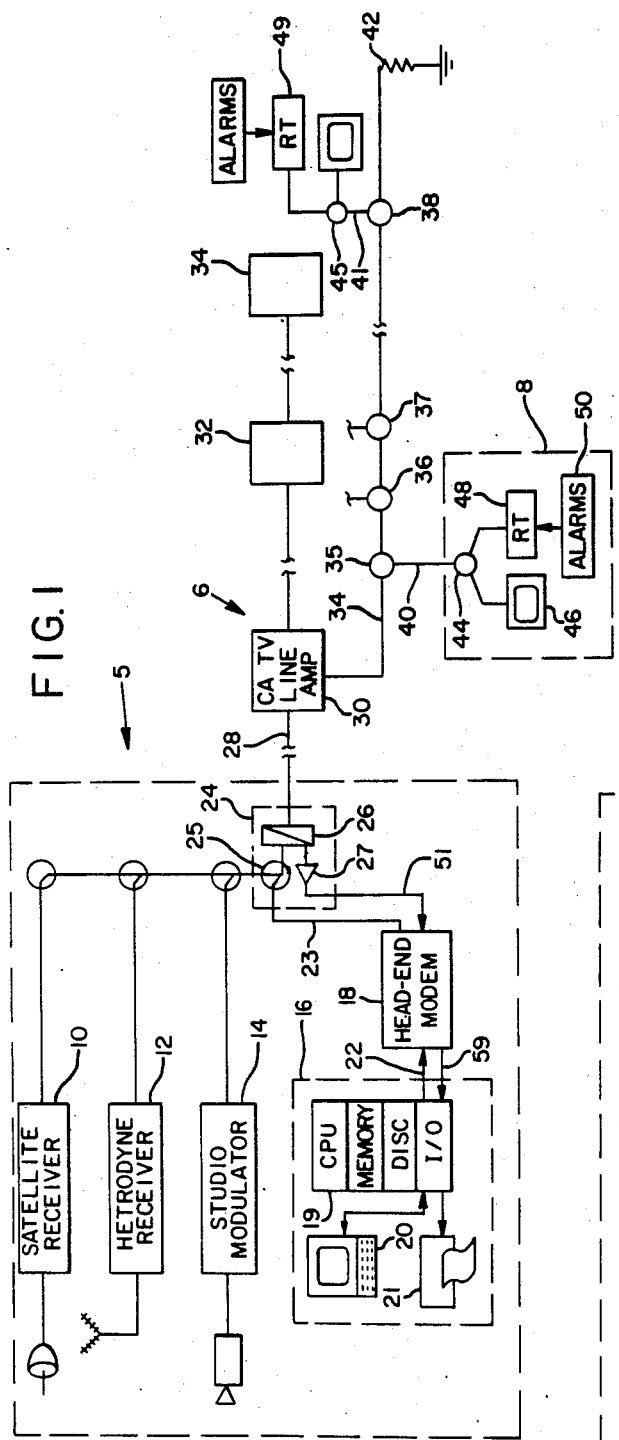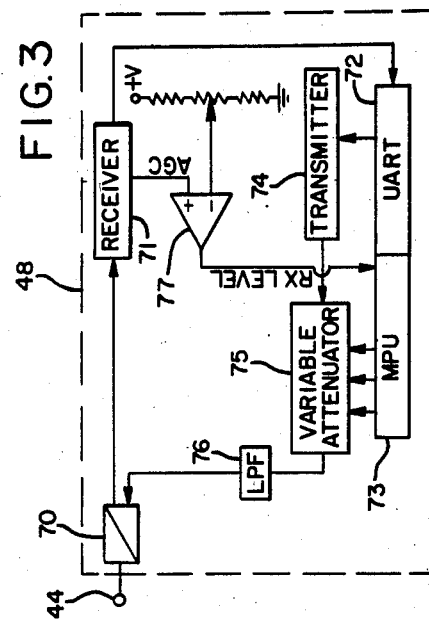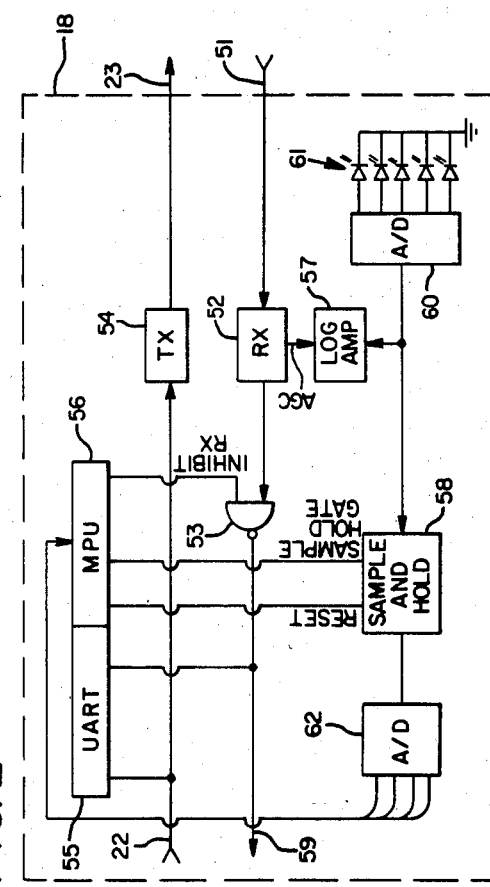

FIG. 5

LEVEL DETAIL

| POLLING SEQUENCE | RESPONSE SEQUENCE |
|---|---|
| @ 0 0 0 1 1 ? —80 | 0 0 0 1 @ —81 |
| @ 0 0 0 2 1 ? | 0 0 0 2 P |
| @ 0 0 0 3 1 ? | 0 0 0 3 @ |
| @ 0 0 6 0 1 ? —82 | 0 0 6 0 @ —83 |
| @ 0 0 0 1 L ? — INTERROGATION | 0 0 0 1 K — TERMINAL 01 INTERROGATION REPLY |
| @ 0 0 6 1 1 ? —84 | 0 0 6 1 @ |
| @ 0 1 1 0 1 ? | 0 1 1 0 @ |
| @ 4 0 9 6 1 ? — INQUIRY | 4 0 9 6 B — MODEM INQUIRY REPLY |
| @ 0 1 1 1 1 ? —85 | 0 1 1 1 @ |
| @ 0 1 1 2 1 ? | 0 1 1 2 @ |
| @ 0 1 1 3 1 ? | 0 1 1 3 @ |
| @ 0 0 0 1 L 8 — ADJUSTMENT | 0 0 0 1 J — TERMINAL 01 ADJUSTMENT REPLY |
| @ 0 1 1 4 1 ? | 0 1 1 4 @ |
| @ 0 1 1 5 1 ? | 0 1 1 5 @ |
| @ 0 1 6 3 1 ? | 0 1 6 3 @ |
| @ 4 0 9 6 1 ? — INQUIRY | 4 0 9 6 A — MODEM REPLY |
| @ 0 1 6 4 1 ? | 0 1 6 4 @ |
| @ 0 1 6 5 1 ? | 0 1 6 5 C |
| @ 0 1 6 6 1 ? | 0 1 6 6 Q |
| @ 0 0 0 1 L 7 — LOCK | 0 0 0 1 J — TERMINAL 01 LOCK REPLY |
| @ 0 1 6 7 1 ? | 0 1 6 7 @ |
| @ 0 1 6 8 1 ? | 0 1 6 8 @ |
| @ 0 2 1 6 1 ? | 0 2 1 6 @ |
| @ 0 0 0 2 L ? — INTERRROGATION | 0 0 0 2 J |

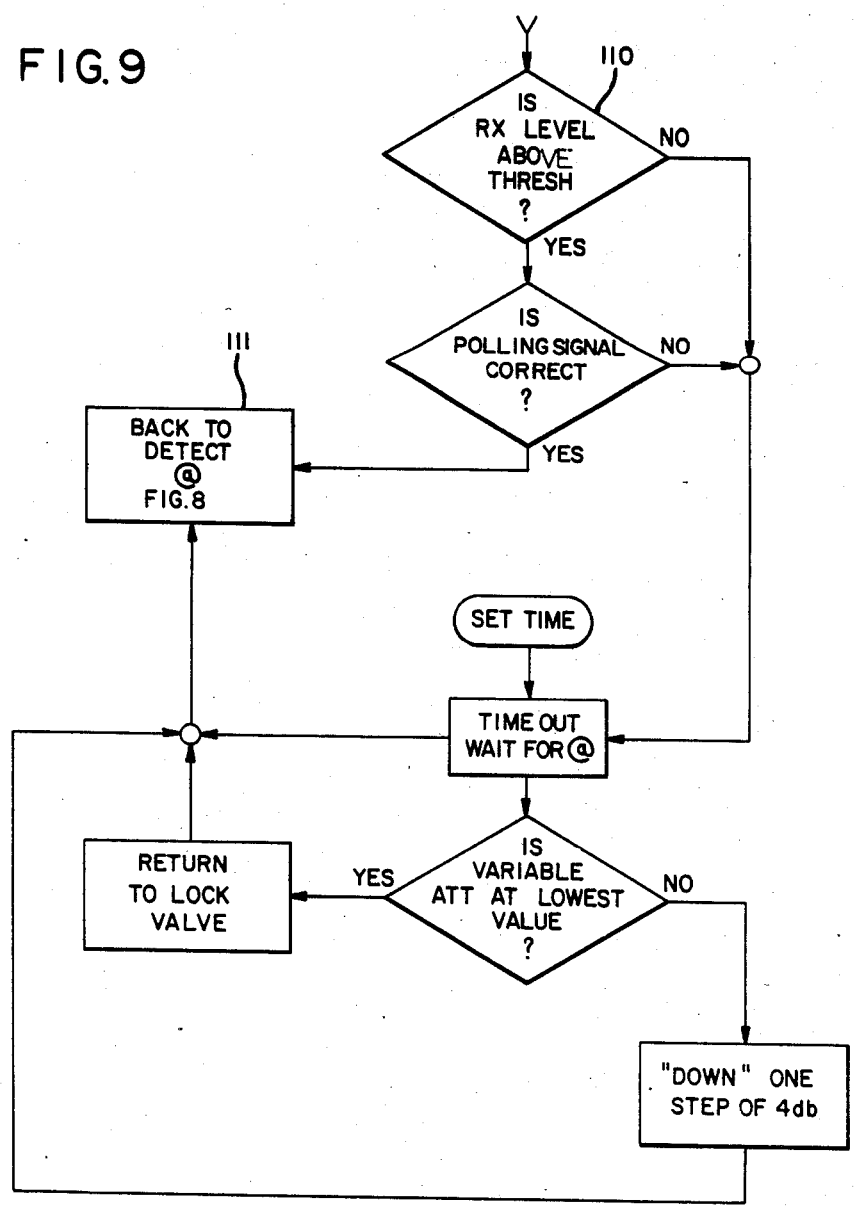

REMOTE LEVEL MEASUREMENT SYSTEM FOR USE IN A MULTI-TERMINAL COMMUNICATIONS SYSTEM

This application is a continuation of application Ser. No. 445,167 filed 11-29-82 now U.S. Pat. No. 4,512,033.

BACKGROUND OF THE INVENTION

This invention relates to bi-directional communications systems in which a master terminal is linked with a multiplicity of remote terminals over a communication network. More particularly, this invention concerns a remote level adjustment system, for use with a bi-directional, multi-terminal communications system, in which a master terminal sets the output signal level of each of a plurality of remote terminals.

The field of bi-directional, mutli-terminal communications systems includes a system wherein a master terminal initiates and controls communications with a plurality of remote subscriber terminals over a common, shared communications channel. Such systems are designed to have the master terminal supervise and monitor activities which occur at the remote terminal sites, with each remote terminal providing data to the master terminal regarding transactions at its respective site. The data can be provided by a remote terminal in the form of a data word produced in response to a request from the master terminal.

A method for organizing the communications in a bi-directional, multi-terminal communications system comprises the well-known polling technique. According to the technique, the master terminal produces a continually cycling sequence of data words, with each word addressed to an individual remote terminal. Each terminal, upon recognizing the word addressed to it, responds with a reply word. The replies from the remote terminals are detectd by the master terminal in an order corresponding to the polling sequence. The polling technique provides an organized method of high-speed communications which allows the master terminal to continually and rapidly update the status of each remote terminal.

One way of interconnecting the master terminal and the remote terminals is by way of an electrical cable network of the type well known in, for example, the cable TV (CATV) industry. Bi-directional multi-terminal communications systems employing cable television distribution networks are taught in Stewart, et al., U.S. Pat. No. 3,846,703, Oakley, et al., U.S. Pat. No. 3,886,454, and Schrock, et al., U.S. Pat. No. 4,343,042. As is well understood by those skilled in the art, a CATV system includes a head-end facility which provides system program signals over a distribution network to system subscribers. The CATV network can provide a direct communication path in a multi-terminal communications system between the master control terminal which may be located at the head-end facility and the remote terminals which are located at subscriber sites.

As is established in the Oakley, et al. U.S. Pat. No. 3,886,454, a CATV distribution network is designed to most efficiently carry signals from the head-end facility to the subscribers. Normally, the losses in the paths from the head-end to the subscribers are equalized in order to equalize the signal levels received at the subscriber sites. On the other hand, on the return paths from subscribers to the head-end, the path losses are not equalized. The result is that when reception of signals transmitted from remote terminals is considered from the perspective of the head-end a wide variation in the level of received signals is encountered. The system of the Oakley, et al. patent does provide a means for reducing return path noise and equalizing return path signals at various points in the network. However, the Oakley system places those means intermediate the head-end and subscribers which reduces the system reliability. Further, it does not provide for direct setting of subscriber signal levels by the head-end which is desirable to prevent intermodulation distortion between return signals before they reach the equalizing means, and to provide fine tuning of the levels within a narrow range.

The establishment of reliable and rapid communications between the remote terminals and the master terminal requires the reception by the master terminal of return data signals from the remote terminals having an average level greater by some margin than the average level of the system noise, but not so great as to create intermodulation distortion in other signals sharing the return path. Moreover, the levels must be equalized in order to reduce the required dynamic range and accompanying response time of the receiver in the master terminal. In the past, the signal levels of remote terminals have been set when a remote terminal is installed, the setting being accomplished by an installation team comprising two technicians, with one technician at the remote site manually setting the level of the subscriber terminal transmitter according to the instructions of the other technician at the head-end who monitors the received signal level. Once set, the remote terminal's signal level in such a system can only be changed in the same manner. Thus, when the conditions of the network change, it is often necessary to dispatch the team to reset the levels of a number of affected remote terminals in a particular area of the transmission network. It is apparent that the provision of an automatic means for setting the transmission level of a remote terminal is highly desirable, both from the standpoint of maintaining an efficient and reliable transmission network which responds quickly to changes in its own transmission characteristics, and reducing the manpower necessary to maintain the network.

The art of automatically adjusting the level of a remotely transmitted signal in a two-terminal system is well established. For example, Boyer U.S. Pat. No. 3,732,496, Tomizawa, et al., U.S. Pat. No. 3,278,850, Young, Jr. U.S. Pat. No. 2,678,998, Ferguson, Jr., et al. U.S. Pat. No. 3,315,164, and Scarla-Neilson U.S. Pat. No. 4,261,054 all teach systems for the setting or change of the level of a remotely transmitted signal. However, these systems are adapted to be used in atmospheric broadcast systems wherein the transmission characteristics are the same in both directions. Moreover, the taught systems, in being directed to two-terminal systems, allocate a higher proportion of time to level-setting activity than can be tolerated in a multi-terminal system wherein a single master terminal must communicate with a large number, for example 10,000, of remote terminals.

It is well known in the art of electronic system design that various functions and activities in bi-directional, multi-terminal communications systems may be controlled by the use of unique, dedicated signals which are generated in the system for specific purposes such as controlling system amplification, restricting system access, and monitoring transmission continuity. Examples are given in Freen U.S. Pat. No. 3,064,195, McVoy U.S. Pat. No. 3,684,823, Gnagi, et al., U.S. Pat. No. 3,665,461, Atkinson, et al., U.S. Pat. No. 3,697,984, and the Stewart patent cited hereinabove. However, none of these references disclose a system for setting the level of signals transmitted by remote terminals.

Examples of devices which perform remote adjustment of transmitted signal levels are found in Watanabe U.S. Pat. No. 4,205,269 and Kowalsik U.S. Pat. No. 4,319,184. However, as both devices depend for their operation on electro-mechanical components, they are relatively slow-acting and inappropriate for use in a highspeed, multi-terminal communications system.

Self-actuated level setting in specific equipments is taught in Moegen, et al., U.S. Pat. No. 4,281,260 and in Haynes U.S. Pat. No. 2,434,155, however, neither reference is directed to the problem of remote level setting in a multi-terminal communications system.

SUMMARY OF THE INVENTION

The present invention overcomes the aforementioned drawbacks of existing bi-directional, multi-terminal communications systems which communicate over an electrical network having nonsymmetrical directional transmission characteristics, through a remote level adjustment system offering the ability to adjust, from a master terminal, the transmission level of each remote terminal in the system. The disclosed remote level adjustment system employs a level-adjusting technique which fits comfortably and efficiently into a multi-terminal system using a polling technique to control intrasystem communications In this invention, a remote signal level adjustment system is provided for use in a multi-terminal communications system whose signals are transmitted bi-directionally over a CATV distribution network. The system of the invention includes a plurality of remote terminals adapted to transmit and receive signals on the network for providing, in response to a polling signal, data regarding transactions at respective remote locations. The remote terminals transmit output signals carrying the data. Each remote terminal includes circuitry to provide, in response to level-setting signals, including interrogation and adjustment signals, a reply signal which is directly measured at the master terminal, and each remote terminal includes circuitry to adjust the level of its respective output signal in response to an adjustment signal.

As is disclosed herein, the invention further includes a master terminal also adapted to transmit and receive signals on the network. The master terminal includes a master computer whose control program includes polling and level-setting routines which enable the master terminal to transmit a polling signal to the remote terminals, and to briefly interrupt the polling signal to transmit level-setting signals directed to a selected remote terminal. After transmission of an interrogation signal, the master terminal resumes transmission of the polling signal while examining the reply signal provided by the selected remote terminal and determines the need to make an adjustment of the output signal level of the selected remote terminal. Examination of the reply signal is accomplished by waiting a predetermined period of time following transmission of the interrogation signal and, at the expiration of that period of time, sampling and measuring the analog level of the reply signal. Thereafter, if desireable, based upon the determination, the master terminal can briefly interrupt the polling signal to transmit an adjustment signal which causes the selected remote terminal to adjust its output signal level according to a predetermined protocol.

In the remote level adjustment system of the invention, the adjustment circuitry in each remote terminal includes a signal source for providing an output signal, a micro-processor programmed to provide, in response to the adjustment signal, control data indicative of the adjustment required by the predetermined protocol, and a variable attenuator which is responsive to the control data and is connected between the signal source and the communications network to introduce the required adjustment into the output signal level of the remote terminal.

The variable attenuator of the invention comprises a plurality of attenuation circuit sections which are adapted to be controlled by the programmed micro-processor to provide a level of attenuation which produces the required adjustment.

Each remote terminal is further provided with a locking means in its micro-processor which enables the terminal to react to an interruption or degradation in communications with the master terminal by adjusting the level of its output signal in a predetermined sequence to a predetermined level.

The master terminal of the invention is connected to the network through a modem which responds to a level-setting signal by sensing the level of the reply signal and storing that level until it receives an inquiry signal from the master terminal. When the modem detects the inquiry signal, it blocks the reception of signals from the network while providing a level signal to the master terminal indicating the reply signal level. By blocking the network, the transmission between the modem and the master terminal is shielded from the network noise. The blocking feature is useful when, for example, the modem and the master terminal are separated by a lengthy transmission path and it is desired to have transmission from the modem to the computer as uncorrupted as possible.

Accordingly, it is a principle objective of the present invention to provide an improved method and apparatus for setting the transmission levels of remote terminals in bi-directional, multi-terminal communications systems.

It is another objective of the present invention to provide a method and apparatus for setting the transmission levels of remote terminals in a multi-terminal communications system employing a polling technique of organizing system communications.

It is yet another objective of the present invention to provide, in a method and apparatus for setting transmission levels of remote terminals, adjustment circuitry which allows the levels to be set automatically.

It is a further objective of the present invention to provide a method and apparatus for the efficient and reliable restoration of communications between remote terminals and a master terminal following an interruption.

It is yet a further objective of the present invention to provide an apparatus for protecting communications between the master terminal and its associated modem while the modem is providing to the master terminal data regarding remote transmission levels.

The foregoing and other objectives, features and advantages of the present invention will be more readily understood upon consideration of the following detailed description of the invention taken in conjunction with the accompanying drawings.

DESCRIPTION OF THE DRAWINGS

FIG. 1 is a block diagram of a bi-directional, multi-terminal communications system of the type employing the present invention.

FIG. 2 is a block diagram of a head-end modem adapted to be used in the present invention.

FIG. 3 is a block diagram of a remote terminal adapted to be used in the present invention.

FIG. 5 illustrates a polling sequence including a level-setting routine to control the operation of the present invention.

FIG. 9 is a logic flow diagram illustrating the system protection routine undertaken by a remote terminal of the invention in response to a loss of communications.

DETAILED DESCRIPTION OF THE PREFERRED EMBODIMENTS

Figure 4:
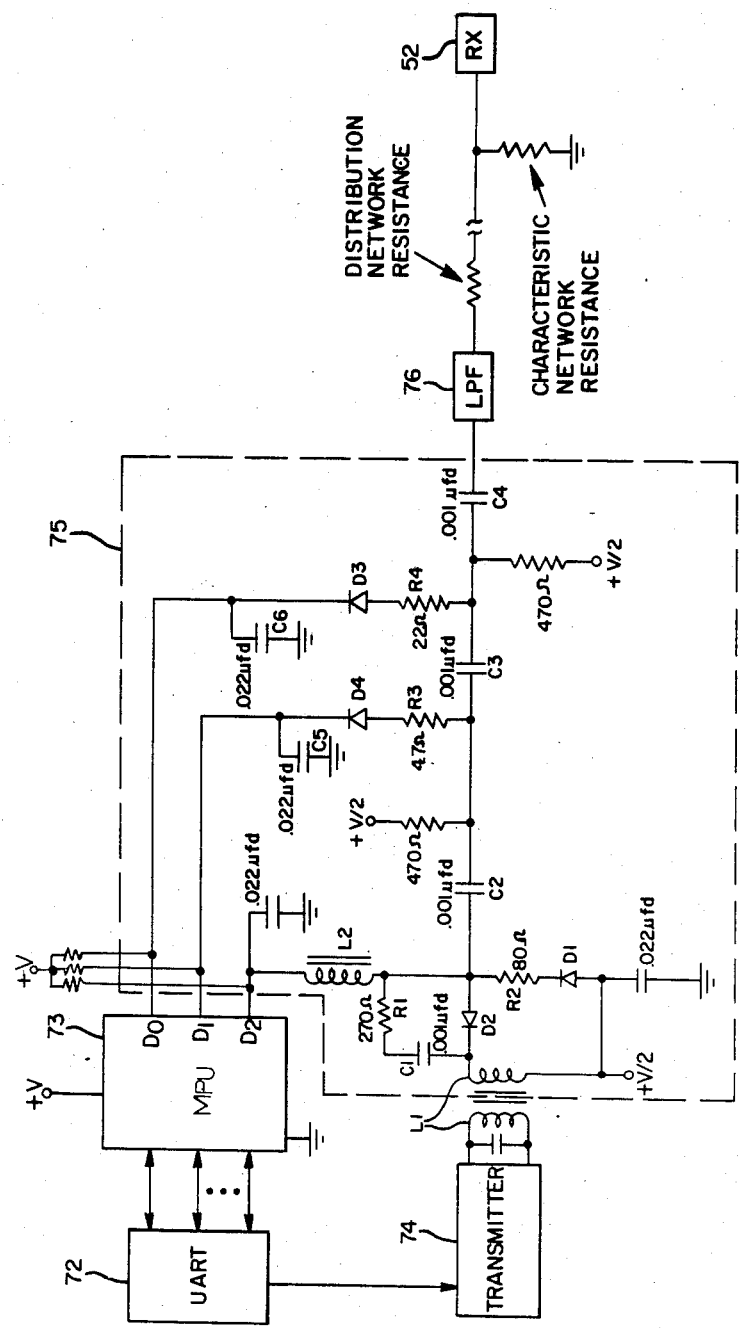
FIG. 4 is a circuit diagram illustrating the variable attenuator of the remote terminal which is adapted to be used in the present invention.

Referring to FIG. 1, there is shown a cable TV (CATV) system in which system program signals from a head-end facility 5 are distributed through a CATV distribution network, indicated generally by 6, to a subscriber's home or place of business, with an exemplary subscriber shown at 8. The head-end facility 5 can comprise a number of program signal sources such as a satellite receiver 10, a heterodyne broadcast receiver 12, and a television studio 14. Also included at the head-end facility is a master terminal 16 which is used to supervise and control the CATV system. The master terminal 16 is interconnected with the CATV distribution network 6 through a head-end modem 18 located at the head-end facility. The head-end modem 18 permits the master terminal to be separated from head-end facility by a considerable distance, if need be.

System program signals flowing from the head-end facility 5 to the subscribers may include a great variety of complex signals. The transmission characteristics of the CATV distribution network 6 in the direction of distribution of the program signals, referred to as the "forward direction," are designed to equally distribute these signals to the maximum number of subscribers. The structures of CATV distribution networks are well known and can be understood with reference, for example, to U.S. Pat. No. 3,886,454 issued to Oakley, et al.

Increasingly, CATV system distribution networks have come to be used for the bi-directional transfer of communications between remote terminals at subscriber sites and the master terminal at the head-end site. Such a multi-terminal system can be used, for example, to implement a security system wherein the master terminal can monitor security alarms at remote subscriber sites through remote terminals placed at those sites. The supervision of communications in such a multi-terminal system, in which the number of subscribers may exceed 10,000, becomes one of the major tasks of the master terminal 16, and it may be accomplished by use of the well-known polling technique, described hereinabove, in which the master terminal 16 continually and cyclically polls the remote terminals to stimulate responses from them regarding transactions at their respective locations.

Except for the modifications of the present invention, such a multi-terminal system is illustrated in FIG. 1 wherein a master terminal 16 comprises a master computer 19 which includes a central processor unit (CPU), a programmed memory section containing control, polling, and level-setting routines, a disc-storage section, and an input/output (I/O) section through which signals flowing to and from the computer pass. A control console 20, including a CRT display and an entry keyboard, and a highspeed printer 21 which provides a written record of all computer transactions may be associated with the master computer 19. The computer preferably is a digital machine whose communications through the I/O section are carried out in serial digital format. Communications flowing between the master terminal and the head-end modem may propogate on a signal conductor or broadcast link. In the preferred embodiment, output digital signals travel on the signal line 22, to the head-in modem 18 which, according to well-known principles, transforms them into modulated signals suitable for transmission on the CATV distribution network 6. The signals output from the head-end modem 18 travel on signal line 23 and enter the head-end coupler 24. Signal line 23 terminates at an input to a directional line coupler 25 which combines the signals emanating from the master terminal 16 with the signals provided by the program signal sources to form a composite program signal. The composite signal passes through the line coupler 25 to a diplexer 26. The composite signal is directed to the CATV distribution network 6 by the diplexer 26 and travels in the forward direction for distribution to subscribers.

In most CATV systems having a plurality of program signal sources and one or more data sources, each source is allocated a frequency band in the composite signal spectrum. Where a multiplicity of such sources feed a CATV system, the composite signal bandwidth can exceed 300 MHz. In the preferred embodiment, the composite signal bandwidth extends from 50 MHz to 300 MHz, with the data signals originating at the master terminal confined to a frequency band contained therein.

The composite signal from the head-end facility travelling in the forward direction through the CATV distribution network 6 enters first the main trunk line 28 which has CATV line amplifiers 30, 32 and 34 at regular intervals for restoration and amplification of the signals.

At each CATV line amplifier, one or more feeder lines may be served which carry the composite signal in the forward direction to the system subscribers. In the preferred embodiment the amplified composite signal enters the feeder line 34 which is served by the CATV line amplifier 30. Subscribers acquire signal power from the feeder line 34 through passive directional subscriber couplers 35, 36, 37 and 38, from which the composite signal is conducted to individual subscriber sites on dedicated subscriber cables, such as cables 40 and 41 in the exemplary embodiment. The feeder line 34 is terminated in its characteristic impedence 42.

In order to equalize subscriber signal levels, the tap ratio of each of the passive directional couplers 35, 36, 37 and 38 is selected to compensate for the transmission loss experienced by the composite signal in the feeder line 34. Thus, the portion of the signal extracted by coupler 38 may be greater than the proportion extracted by coupler 35; such couplers may have tap ratios varying, for example, from 4 dB to 33 dB. However, since the composite signal level is lower at coupler 38 than the level 35 because the composite signal has been attenuated by transmission through the feeder cable 34 and tapping at intervening couplers, the magnitude of the composite signal level provided to the subscriber cable 41 is equal to the magnitude of the composite signal level provided in subscriber cable 40.

At subscriber site 8, typical of subscriber sites in the system, the composite signal is separated by a passive signal splitter 44 which divides the composite signal power between a video display device 46 and a remote subscriber terminal 48. In the remote terminal 48, the data signals originating at the master terminal and intended for the remote terminal are extracted from the composite signal as explained hereinbelow.

Data signals transmitted from the remote terminal 48 to the master terminal 16 travel in the "return direction" through the CATV distribution network 6. In most systems, data signals from the remote terminals are contained in a return frequency band, located below the composite signal band, which is reserved for carrying return signals from a variety of subscriber sources. For the preferred embodiment, the return data channel is locatd in a return frequency band extending from 5 MHz to 30 MHz.

Thus, the remote terminal 48 can transmit signals to the master terminal 16 regarding the status of, for example, the security alarms 50. The signals from the remote terminal 48 are directed through the signal splitter 44 onto the subscriber cable 40 from which they are directed onto the feeder line 34 by way of the passive directional coupler 35. As is known in the art, the CATV line amplifier 30 is provided with the ability to separate signals travelling in the return direction on the feeder line 34, and it amplifies those signals and injects them into the main trunk cable 28 through which they are conducted to the head-end coupler 24. In the head-end coupler 24 the return signals pass through the diplexer 26 which directs them to the line post amplifier 27. The line post amplifier 27 passes the return signals along signal line 51 to the head-end modem 18. The head-end modem 18 receives, detects and demodulates the signals according to wellknown principles and transmits them on signal line 59 in serial digital format to the I/O section of the master computer 19 in the master terminal 16.

As is well known, during transmission in the forward direction through the CATV distribution network 6, signals encouter loss principally from two sources: transmission in the feeder and subscriber lines, and flat loss at the subscriber couplers. As described above, the losses in the forward direction are shaped in order to equalize the composite signal levels at the subscriber sites. Since at least part of these losses, for instance the transmission loss through the feeder line, are frequency-dependent, they will have a different value for signals travelling in the return direction which are contained in the return frequency band below the band of the composite signal. Consequently, the return signals experience very little transmission loss through the feeder and subscriber lines, but encounter differing losses through the subscriber couplers. If all remote terminals are set to emit signals at one level of power, the transmitted data signal from remote terminal 48 will encounter a higher loss in coupler 35 than the signal from remote terminal 49 will encounter in coupler 38. Thus, since the signals will encounter a negligible transmission loss, the levels of the signals, when passed through the system and measured at the head-end coupler 24, will vary markedly from one another with the signal from remote terminal 49 exceeding that of remote terminal 48.

The level of the return data signals must be limited within a range of values to ensure the reliable operation of and rapid communications in the multi-terminal system. In the first case, the signal level must exceed the system noise floor by a margin determined by the required system bit error rate, but must be kept below a maximum level to avoid the production of intermodulation distortion products in, for example, a return video channel which might share the return frequency band. In the preferred embodiment, with all measurements being made at the head-end modem, the noise floor in the return direction is 10 dBmV, the maximum return video level is 37 dBmV, and the required data signal/noise ratio is 10 dB, where, as is known in the CATV art, 0 dBmV is equivalent to 1 millivolt measured across 75 ohms. Thus, if the return data signal level is to be below the peak carrier level by 10 dB, it must be limited to the range of 20 dBmv to 27 dBmV.

In the second case, the receiver of the master terminal 16 can be designed to accomodate the variation in return data signal levels by provision of a wide dynamic range. However, the speed of communications in the system will be limited by the maximum receiver response time measured between the strongest and weakest return signals. Since the speed of communications helps to determine the maximum number of remote terminals, it is apparent that response time must be minimized. Remote terminal transmission levels must be set individually to equalize the level of return signals at the head-end.

The remote level adjustment system of the invention obviates the need for deploying a pair of technicians to set transmission levels of remote terminals by providing means to automatically sense and set the level of any selected remote terminal without human assistance. Moreover, the method of the remote level adjustment system is easily adapted for efficient use in a polling scheme which may be used to supervise and control communications in the system.

The multi-terminal communications system of FIG. 1 may be modified according to the present invention to include a remote level adjustment system comprising a master terminal 16 whose control program includes a level-setting routine, and a plurality of remote terminals, for example 48 and 49, having the capability to respond to certain level-setting signals provided by the master terminal by adjusting their output signal levels. The multi-terminal system is interconnected by the CATV distribution network 6 for bi-directional communications between the master terminal 16 and the remote terminals 48 and 49. Communications in the multi-terminal system are supervised and controlled by a polling program in the master computer 10 which causes the master terminal 16 to produce a continuously cycling polling signal comprising a series of digital words which are intelligible to the remote terminals, with each word bearing the address of a specific terminal. Recognition of its address stimulates a terminal to transmit a reply signal. The level-setting routine of the master computer 19 periodically and briefly interrupts the polling signal to cause the master terminal 16 to transmit level-setting signals, including interrogation and adjustment signals, to a selected remote terminal, for example remote terminal 48, which are used as described hereinbelow to measure and adjust the level of that terminal's transmitted signal. The level-setting signals also elicit reply signals from the selected terminal which are identical in format to the reply words transmitted in response to the polling signal.

With reference to FIG. 2, which illustrates the head-end modem 18 in greater detail, certain operations of the invention can be understood. Signals from the master terminal 16 enter the modem in serial digital word format on line 22 which terminates on an input node of the modem transmitter 54. The modem transmitter 54 transforms the digitally-formatted signals by any well-known modulation technique which may be selected into a form suitable for transmission in the forward direction. The transformed signals are conducted to the head-end coupler on signal line 23 to be placed on the distribution network 6 as described hereinabove. Also connected to sense the signals on line 22 is a universal asynchronous receive-transmit module (UART) 55, operating according to well-known principles which provides an input to a modem microprocessor unit (MPU) 56.

All reply signals from the remote terminals enter the head-end modem 18 on signal line 51 which terminates on an input node of receiver 52. The receiver 52, which includes a band-pass filter to limit the input power to the portion of the return signal spectrum devoted to remote terminal communications, transforms the reply signals into serial digital format by any demodulation and restoration techniques selected to operate in conformance with the modulation format of the remote terminal transmitters. The serial digital output of the receiver 52 travels through the nand gate 53 which is controlled by an INHIBIT RX line extending from the MPU 56. The reply signals pass through the nand gate 53 on signal line 59, out of the modem 18, to the master terminal 16.

In the preferred embodiment, the receiver 52 has an AGC loop for responding to variations in the received signal level. The AGC loop of the modem receiver 52 is tapped and a portion of the AGC signal is conducted on the AGC signal line to the input of a logarithmic amplifier 57. The logarithmic amplifier 57 provides a signal output which is proportional to the 20 $\log_{10}$ of the level of the receiver AGC signal, and hence to the power level of the reply signal being received by the head-end modem 18. The output of the logarithmic amplifier 57 is directed to an analog-to-digital converter 60 which feeds a light-emitting diode array 61 to provide a visible indication of the level of the signal present at the input to the receiver 52. The output of the logarithmic amplifier is also directed to a sample-and-hold circuit 58 which is controlled by a pair of control signal lines, labeled RESET and SAMPLE HOLD GATE, extending from the MPU 56. The output of the sample-and-hold circuit 58 is converted into digital form by an analog-to-digital converter 62 and a digital representation of the sampled signal power level is provided, in turn, to the MPU 56.

In the level-setting routine of the master terminal 16, the master terminal briefly interrupts the polling routine to first provide an interrogation word addressed to a selected remote terminal. The MPU 56 is programmed to inspect all signals coming from the master terminal and to recognize and react to the interrogation signal. When the MPU 56 recognizes the interrogation signal, it clears the sample-and-hold circuit 58 via the RESET line and waits for a period of time at least sufficient for the interrogation signal to be transmitted and detected and a reply signal to be sent by the selected remote terminal. At the expiration of the period of time required for transmission of the interrogation signal and its associated reply signal, the MPU 56, via the SAMPLE HOLD GATE line, causes the sample-and-hold circuit 58 to sample and hold the peak level of the output of the logarithmic amplifier 57. This peak level, representing the peak level of the reply signal transmitted by the selected remote terminal, is converted immediately by the analog-to-digital converter 62 into a digital word representing the peak signal; the word is provided to and stored in the MPU 56.

At a time subsequent to the transmission of the interrogation signal, the master terminal 16 will briefly interrupt the polling signal to send an inquiry signal to the modem 18 on signal line 22 which is detected by the UART 55. The inquiry signal will cause the MPU 56 to output, through the UART 55, a digital word representing the level of the reply word. The UART 55 transmits this level word in serial digital format on signal line 59 to the I/O section of the master computer 19. In its level-setting routine, the master computer 19 addresses a reference level selected to ensure reliable communications against which the level of the reply signal received from the selected remote terminal is compared.

In the level-setting routine, the master computer 19 looks for one of three results. According to one result, the level of the reply signal can be lower than the reference by more than some predetermined amount. Another result is that the level of the reply signal can exceed the reference level by more than some predetermined amount. The third possible result is that the level of the reply signal is within some acceptable range of the reference signal. In the last case, the polling routine of the master computer selects another remote terminal whose transmission level is to be examined and initiates the sequence described above. In either of the first two cases, the computer is programmed to briefly interrupt the polling signal to transmit an adjustment signal to the remote terminal which provided the unacceptable reply signal. The adjustment signal causes the selected remote terminal to increase or decrease its signal transmission level in a manner described hereinbelow, and to transmit a reply signal. The MPU 56 of the head-end modem 18 is also programmed to recognize and react to the adjustment signal by waiting for a period of time sufficient for the reply signal transmitted by the selected terminal in response to the adjustment signal to be received and then measuring it. After producing the adjustment signal, the master computer 16 again sends an inquiry signal, receives the level signal from the head-end modem 18, and compares the measured level to the reference level. In this manner, the master terminal can continue to adjust the transmission level of this selected remote terminal until its reply signal level falls within the acceptable range established by the reference level.

Once the level of the reply signal received from the selected terminal is satisfactory, the level-setting routine causes the master terminal 16 to issue a lock word addressed to the selected remote terminal commanding it to maintain its transmission level, and then to select another remote terminal, have its reply signal level measured, and adjust its transmission level if need be. In this manner, the reply signal level of each remote terminal can be measured and adjusted on a recurring basis.

The operation of a remote terminal in response to level-setting signals can be understood with reference to FIG. 3. A portion of the composite signal is directed by the signal splitter 44 to the remote terminal 48 wherein it first passes through a diplexer 70 to the input node of the receiver 71. The input section of the receiver 71 includes a band-pass filter which passes only the frequency band reserved for master terminal transmission. The receiver 71 then demodulates the signals from the master terminal by a technique matched to the modulation format of the head-end modem 18 and restores them to serial digital word format. The receiver 71 provides the serial digital word to a UART 72. The UART 72 converts the word into a parallel format and provides it to a micro-processor unit (MPU) 73 which, through a level-changing routine, decodes the word, inspects its address, and executes the action commanded if the address of the word corresponds to the address of its terminal.

The receiver 71 of the remote terminal 48 also has an AGC loop to accomodate variation in its received signal level. The loop is tapped by the AGC line which provides a first input to the comparator 77. A second input to the comparator 77 establishes a switching level which enables the comparator to change states according to well-known principles. The output of the comparator is fed to the MPU 73 on the RX LEVEL signal line. Thus, the level of the received signal propagating to the remote terminal can be monitored and the MPU 73 notified when the level passes through a reliability threshold below which the system design does not guarantee normal communications to be carried on. Thus, when, for example, the level of the received signal falls, the AGC level in the preferred embodiment will fall in an attempt to increase the gain of the receiver 71. When the AGC level falls below a certain point corresponding to the reliability threshold, that point being set at the second input to the comparator 77, the comparator changes state. The MPU 73 is programmed as described hereinbelow to react to the change of state. Similarly, when the received signal level rises, and in rising causes the AGC level to rise above the transition point of comparator 77, the MPU 73 is programmed to react to the change as described hereinbelow.

When the MPU 73 detects its terminal's address, it takes the level-setting action commanded and provides a reply word to UART 72 which converts the response into serial digital format and provides it as an input to the transmitter 74. The transmitter 74 transforms the serial digital word by any well-known modulation technique which may be selected into a reply signal having form suitable for transmission in the return direction to the master terminal 16. The output of the transmitter 74 is connected to a variable attenuator 75 which sets the signal power level and provides the attenuated signal through the lowpass filter 76, which attenuates harmmics produced by the transmitter above 30 MHz, to the diplexer 70 which directs it to the passive directional coupler 44. The coupler 44 conducts the signal into the subscriber cable 40 for transmission in the return direction to the master terminal.

When the MPU 73 of the remote terminal 48 detects an interrogation word bearing its address, it provides a reply word through the UART 72 to the transmitter 74 as described above. When the MPU 73 detects an adjustment command signal, it produces a digital word which is output to the variable attenuator 75 and which causes the variable attenuator 75 to to change its attenuation characteristic to produce a corresponding change in the level of the transmitted signal which passes through it. At the same time, the MPU 73 provides a reply word through the UART 72 to the transmitter 74 for transmission to the master terminal 16. The head-end modem 18 will measure the level of the reply word in the manner described hereinabove.

Referring now to FIG. 4, there is shown in greater detail the variable attenuator provided in each remote terminal of the invention. As is shown, the output of the transmitter 74, comprising in the preferred embodiment an RF carrier contained in the frequency range from 5 MHz to 30 MHz, is coupled to the variable attenuator 75 through an RF coupling transformer L1. The variable attenuator 75 comprises three selectable attenuation circuits providing 0 dB, 4 dB, 8 dB and 16 dB of signal power attenuation, respectively. Under the control of the MPU 73, the three sections can be interconnected in eight different configurations to provide a 28 dB range of output signal power attenuation extending from 0 dB to 28 dB, in steps of 4 dB each, with the measurement being made at the head-end modem receiver 52 across the characteristic impedence of the distribution network.

The control of the attenuation sections of the variable attenuator 75 is excercised by the MPU 73 through the output data lines which are connected to signal nodes $D_0$, $D_1$, and $D_2$, respectively. For 0 dB attenuation, the outputs of signal nodes $D_0$, $D_1$, and $D_2$ of the MPU 73 are held high, near the value of the bias voltage $+V$. This reverse biases diodes D1, D3, and D4 and forward biases diode D2, providing a direct RF signal path from the transformer L1 through capacitors C2, C3, and C4 out of the variable attenuator 75 and through the low-pass filter 76. The 16 db attenuation section is selected by holding signal nodes $D_0$ and $D_1$ at $+V$ and dropping signal node $D_2$ to near ground. The ground value at signal node $D_2$ reverse biases diode D2 and forward biases diode D1, turning it on. With diode D1 on, an attenuation circuit of the well-knpwn T-network type is formed, with the series branch resistances comprising resistor R1 in one branch and the series resistances of the low-pass filter 76 and the CATV distribution network 6 in the other branch; the resistor R2 provides the shunt resistance between the two series branches. Similarly, when the output voltage level at node $D_1$ of the MPU 73 is reduced to near ground, diode D4 is biased on and an RF path through resistor R3 and capacitor C5 is provided. When diode D3 is forward biased by providing ground from signal node $D_0$ of the MPU 73, a shunt path comprising resistor R4 and capacitor C6 is formed. With the diodes D2 and D4 alone forward biased, the perfered embodiment imposes 8 dB of attenuation on the signal power level through a T-network in which R3 forms the shunt resistance, the resistances of transformer L1 and capacitor C2 form the resistance of one series branch, and the resistances of the low-pass filter 76 and the distribution network 6 constitute the resistance of the other series branch. When only diodes D2 and D3 are forward biased, 4 dB of attenuation is provided, with R4 comprising the shunt resistance of a T-network wherein the resistance of one series branch comprises the resistances of transformer L1 and capacitors C2 and C3, and the resistance of the other series branch comprises the resistances of the low-pass filter 76 and the distribution network 6.

Table I relates the combinations of voltages at signal nodes $D_0$, $D_1$, and $D_2$ of the MPU 73 to the values of attenuation assumed by the variable attenuator of the preferred embodiment. In the table, the notation $D_x$ denotes $+V$ at the node and $\overline{D}_x$ indicates the node is at ground.

TABLE I

| Node Voltage | | | Attenuation |
|---|---|---|---|
| $\overline{D}_0$ | $\overline{D}_1$ | $\overline{D}_2$ | 0 |
| $D_0$ | $\overline{D}_1$ | $\overline{D}_2$ | 4 |
| $\overline{D}_0$ | $D_1$ | $\overline{D}_2$ | 8 |
| $D_0$ | $D_1$ | $\overline{D}_2$ | 12 |
| $\overline{D}_0$ | $\overline{D}_1$ | $D_2$ | 16 |
| $D_0$ | $\overline{D}_1$ | $D_2$ | 20 |
| $\overline{D}_0$ | $D_1$ | $D_2$ | 24 |
| $D_0$ | $D_1$ | $D_2$ | 28 |

The circuit arrangement illustrated in FIG. 4 gives the remote level adjustment system of the invention the capability of adjusting the power level of the reply signal at the head-end modem by having the master terminal 16 transmit adjustment words to which the MPU 73 in the remote terminal 48 will react by changing the combination of attenuation sections which will correspondingly vary the level of the signal produced by the remote terminal. In the preferred embodiment, when the master terminal 16 determines that the measured reply signal level does not fall within the signal range which is given by:

$$10(\text{Log}_{10}L_r) - 4\text{dB} \leq 10\text{Log}_{10}L_s \leq 10 - (\text{Log}_{10}L_r) + 4\text{dB} \tag{1}$$

where $L_r$ is the reference power level and $L_s$ is the reply signal power level measured at the head-end modem, it will command the remote terminal 48 to change the setting of the variable attenuator 75 by a 4 dB step in the direction required to bring the reply signal level into the predetermined range. As is apparent, if the reply signal deviates in either direction from the reference level by more than 8 dB, more than one adjustment step will be required.

FIG. 5 illustrates, from the points of view of the master computer 19 and the remote terminal MPU's, the sequence of signals transmitted between the master terminal 16 and the remote terminals in the course of a polling routine which includes a level-setting routine. With reference to FIGS. 5–9, the level-setting routine of the invention can be constructed and entered into the control program of the master computer 19 according to principles which are well known in the art of computer programming, and appropriate response routines can be similarly written and entered into the MPU's of the head-end modem and the remote terminals.

The polling sequence illustrated in FIG. 5 in the lefthand column shows the digital words which collectively make up the polling and level-setting signals transmitted by the master terminal 16. In the righthand column, the digital words which make up the reply signals provided by the remote terminals in response to the lefthand column signals are illustrated. The characters of the words in each column are represented in ASCII format and are read from left to right. Each outgoing word transmitted by the master terminal 16 is initiated by a delimiting or framing character, @, which is followed by four characters representing the address of the remote terminal to which the word is directed. The sixth character provides a subaddress which can be used to single out particular subassemblies in the remote terminal, including the variable attenuator. A question mark (?) in the seventh character position of a polling word commands the remote terminal to indicate the status of the subassembly indicated by the subaddress.

The MPU provided in each remote terminal is programmed to interpret the polling, interrogation, and adjustment words and to take the action required when it recognizes its own address. Each polling, interrogation, or adjustment word elicits a reply word from the remote terminal to which it is addressed, which is transmitted in the return direction to the master terminal. The format of the reply words include four ASCII characters indicating the terminal's address and a fifth ASCII character reporting the status or result of action requested by the word from the master terminal.

In the polling sequence the master terminal addresses the remote terminals individualy and in numerical sequence beginning with the first terminal, ending with the last, beginning again with the first, and so on. The example of FIG. 5 illustrates how the level-setting routine, introduced above and explained in greater detail hereinbelow, can be interwoven into the polling sequence to systematically measure reply signal levels and adjust those levels using the remote level adjustment system described hereinabove. In the polling sequence of FIG. 5, the polling word 80 directs subassembly 1 in remote terminal 01 to report on its status, and remote terminal 01 transmits a response word 81 indicating the requested status. After subassembly 1 in remote terminal 61 is requested by polling word 82 to report on its status and provides the appropriate reply, word 83, the next word is directed once again to remote terminal 01, but this time it constitutes an interrogation signal by virtue of a level indicator L and ? appearing in the sixth and seventh positions of the word. After the interrogation word is produced, the polling sequence resumes with polling word 84. The status information provided by remote terminal 01 in its reply word transmitted in response to the interrogation signal, is a matter of design choice; in the preferred embodiment, the status indicates the present setting of the variable attenuator, represented in the example by K.

As is described hereinabove, the MPU 56 of the head-end modem 18, alerted by detection of the interrogation word, measures the level of the reply word from the remote terminal 01. At some point in the polling sequence the master terminal transmits the inquiry word bearing the address of the MPU 56 in the head-end modem 18, which is 4096 in the example. After the inquiry word is transmitted, the polling sequence again resumes with polling word 85. In response to the inquiry word, the head-end modem transmits a reply word bearing its address and the measured level, represented in the example by B. The master computer 19 then compares this level against the reference level according to the equation (1) and takes the appropriate action. In the example, an adjustment word addressed to terminal 01 is produced. In the preferred embodiment, an adjustment word has the attenuation level indicator L in the sixth character position, followed by an 8 for a one-step attenuation decrease or a 9 for a one-step increase. In response to the adjustment command, the remote terminal 01 transmits a reply word which is measured at the head-end modem 18 whose MPU 56 has been alerted by the adjustment word to measure the level of the reply word. Later in the polling sequence, the master terminal 16 sends the inquiry signal to the head-end modem 18 which responds in the manner described hereinabove. Assuming that the level indicated falls within the required range of the reference level, the level-setting routine causes a lock word to be transmitted, indicated by the L7 in the sixth and seventh character positions, which causes the MPU in remote terminal 01 to maintain and store the present setting of the variable attenuator. Remote terminal 01 then provides a reply word indicating the present setting of its adjustable attenuator. After a normal progression of the polling sequence to remote terminal 216, the master computer 19 selects remote terminal 11 with which to begin another level setting routine and transmits an interrogation word.

Figure 6:
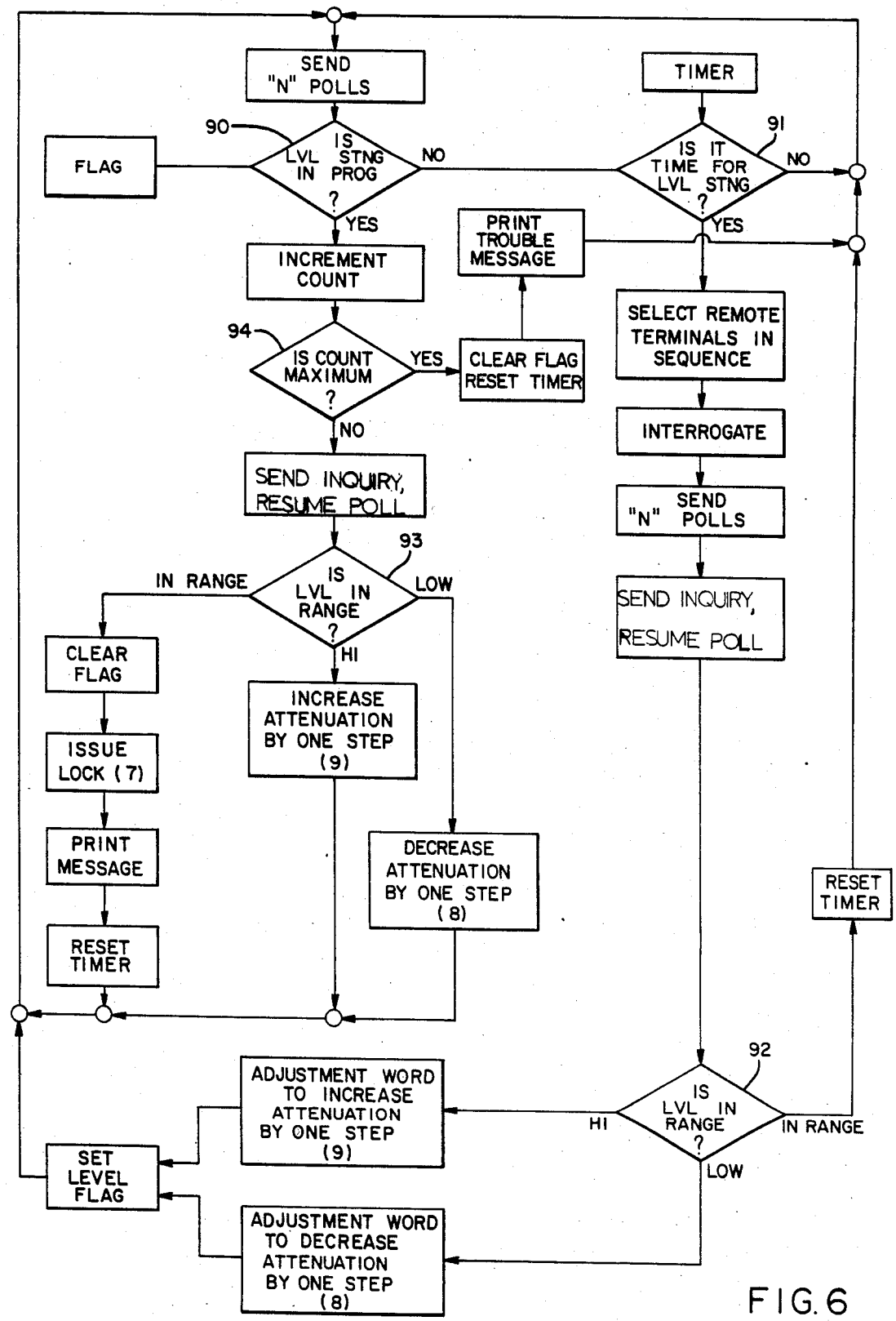
FIG. 6 is a logic flow diagram illustrating the level-setting routine executed by the master terminal of the invention.

The relationship between the level-setting routine and the polling routine in the control program of the master computer 19 can be understood with reference to the logic flow diagram of FIG. 6. Typically, a polling routine can be interrupted after the transmission of a selected number, N, of polls to enter the level-setting routine. In the example of FIG. 5, for instance, N equals 50. First, the master computer determines, in decision block 90, whether a level-setting routine is in progress. If not, a timer, which can comprise a cycling ring counter in the CPU of the master computer 19, or a software timing routine in the computer program, is consulted to determine whether a level check should be undertaken. The setting of the timer can be varied to suit the purposes of the system designer. Essentially it establishes a minimum time between successive executions of the level-setting routine. If the time has not elapsed, the level-setting routine follows the negative exit from decision block 91 and regular polling resumes.

After N polls have been transmitted, and again assuming the level-setting routine has not been initiated, at the next check of the timer a decision is made that the time is current to check the level of a remote terminal. The routine takes the affirmative exit from decision block 91, selects the address of the next remote terminal whose level is to be measured, and sends a level interrogation signal. Then polling is resumed for N cycles, after which the inquiry word is transmitted to the head-end modem 18 and polling is resumed. The level-setting routine then enters decision block 92 where it checks the measured level. If the level is satisfactory, the computer again executes N polls, sets the timer, and, once again, enters the level-setting routine through decision block 90. If, however, the level checked at decision block 92 is too high or too low, the computer issues an increment or decrement adjustment command to change the setting of the variable attenuator in the selected remote terminal by ±4 dB, and sets a level-set flag to indicate that a remote terminal level setting is in progress. After issuing the appropriate adjustment command, the computer reverts to the polling cycle, completes N polls, and once again enters the level-setting routine through decision block 90. Now, as the level flag is set, the routine takes the positive exit from decision block 90, increments a counter, and performs a level-check sequence which flows through decision block 93. If the level is satisfactory, the level-set flag is cleared, the lock command is issued, a message is printed on the master terminal printer 21 indicating that the level required resetting, and the timer is reset.

The number of adjustments attempted for any one remote terminal will be set in a counter which may be contained in the computer 19 and which is inspected in the positive exit from decision block 90. Either the received level will fall within the acceptable range of the reference level after no more than seven adjustments, or the level-setting routine will cause the counter to increment beyond its count upon which the computer will determine that a level setting was not possible. In this case, the level-setting routine will follow the positive exit from decision block 94, reset the level flag and the timer, cause a trouble message to be printed out on the printer 21, and reenter the polling routine according to the flowchart.

It can be appreciated that the variability of N and the timing circuit interval, together with the conformity of the level-setting and polling signal formats permit the master terminal to perform level setting when convenient, without undue interruption of system communications, or not to perform it when conditions do not permit, the result of which is to enhance system communcations efficiency.

Figure 7:
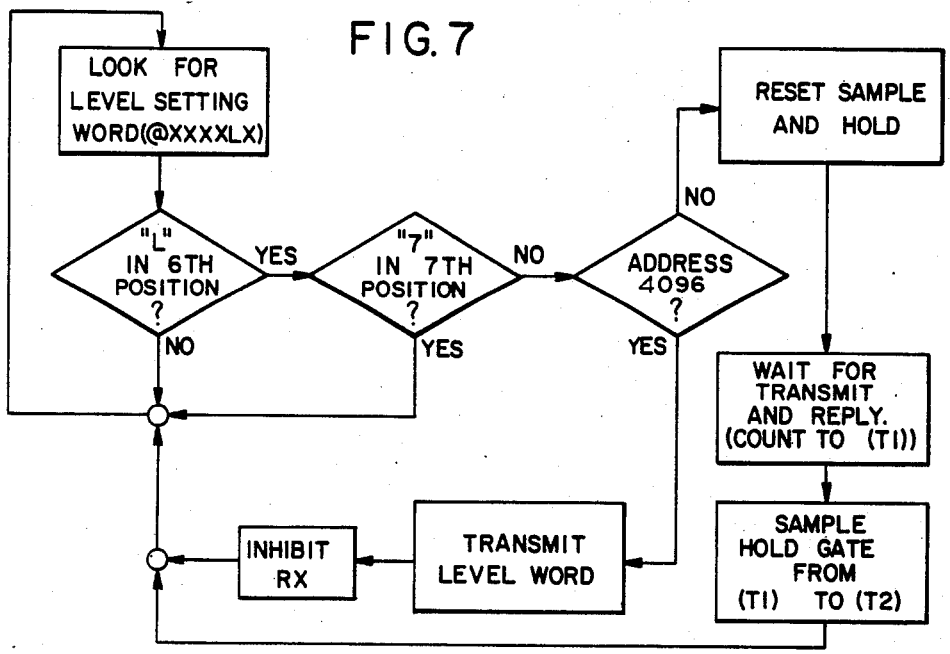
FIG. 7 is a logic flow diagram illustrating the level measurement sequence undertaken by the head-end modem of the invention.

The program for the MPU 56 in the head-end modem 18 includes a level-checking routine illustrated in FIG. 7. As described hereinabove, the MPU 56 inspects each word of the polling sequence to check for an ASCII L in the sixth character position which denotes an interrogation, adjustment or lock word. If an L is not noted, then the MPU 56 simply continues looking. If, however, the L is encountered, the MPU 56 inspects the seventh character of the word to determine whether it contains a 7 indicating the word is a lock command. If so, the MPU 56 continues looking as no action is required of it; if not, the MPU inspects the address included in the word to determine whether it is its own. In the example, 4096 is reserved as the address of the head-end modem 18. If it is not encountered, then the MPU 56, knowing that a level-setting signal is being transmitted, resets the sample-and-hold circuit 58 on the RESET signalling and begins a timer which can comprise a programmable electronic counter or a subroutine in the MPU program. The timer is set to indicate the elapse of time required for propagation of the level-setting signal to and the reply signal from the selected remote terminal. At the end of the propagation time, the MPU 56 provides a signal which closes the sample gate of the sample-and-hold circuit 58 to sense the variation in the level of the signal provided by the logarithimic amplifier 57. The delay between detection of an interrogation or adjustment signal and initiation of the SAMPLE HOLD GATE signal, beginning at T-1 and ending at T-2, can be made programmable at the MPU 56 to take into account various delays encountered in transmission through the distribution network and between the head-end modem and the master terminal, and from processing encountered in either of those transmissions. The time period between T-1 and T-2 is set to span the average time of a reply word. When the timing signal is removed at T-2 from the SAMPLE HOLD GATE line of the sample and hold circuit 58, the gate is opened and the peak level of the reply signal is retained in the circuit. As described above, the peak signal level is immediately converted to digital format and conducted to the MPU 56. The MPU 56 awaits the inquiry signal bearing its address from the master terminal which, when detected, causes the MPU 56 to provide the level signal through UART 55 to the master terminal 16 in the manner described hereinabove.

Referring once again to FIG. 2, a significant reliability feature of the remote level adjustment system of the invention can be appreciated. At the time that the MPU 56 provides the measured response signal level to the master terminal 16, its program can be adapted to include a low voltage signal provided on the INHIBIT RX line to the nand gate 53 which will cause the output of the gate to rise and remain high, thus effectively disconnecting the output of the receiver 52 from signal line 59. The nand gate 53 functions as a switch to decouple the receiver 52 from the signal line 59 and prevent its amplifier noise from affecting the reply signal indicating the measured signal level which the head-in modem 18 transmits by way of the UART 55 to the master terminal 16.

It will be appreciated that in systems where the master terminal 16 may be placed in the immediate vicinity of the head-end modem 18 and the head-end coupler 24, that the I/O section of the computer 19 can be augmented with sample-and-hold and analog-to-digital conversion circuitry to enable it to perform the reply signal sampling and conversion functions specified in the preferred embodiment for performance by the head-end modem 18. In addition, the level-setting routine of FIG. 5 can be modified to delete the inquiry transaction between the master terminal 16 and the head-end modem 18, and expanded to include a sequence for generation of RESET, SAMPLE HOLD GATE, and INHIBIT RX signals to control the associated functions.

Figure 8:
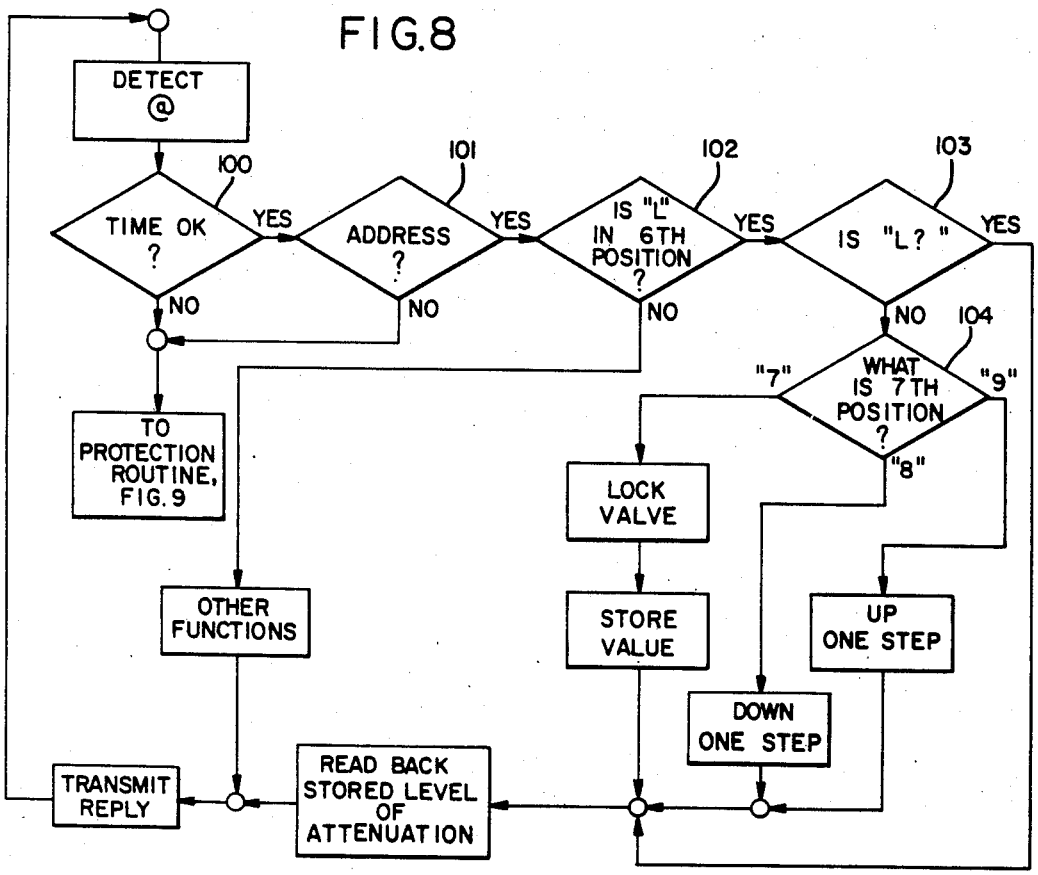
FIG. 8 is a logic flow diagram illustrating the level-setting response undertaken by a remote terminal of the invention.

With reference to FIG. 8, the level-setting response routine provided in the control program of the MPU 73 of the remote terminal 48 can be understood. The routine is initiated when the remote terminal MPU recognizes a proper framing character which prepares it to inspect the following four characters comprising the terminal address to which the word is directed. Decision block 100 can comprise a timing subroutine to ensure that frequency of occurrence of framing characters corresponds to the frequency of occurrence of system polling words. Assuming that a framing character is detected in the proper time period, the four characters following it are inspected and, if they match the address of the remote terminal, the routine follows the positive exit from decision block 101 and enters decision block 102 where the sixth character of the word is inspected to determine whether an L is present, which indicates that some level-setting activity is to be undertaken. Assuming that an L is absent, the routine follows the negative exit to perform other functions after which it transmits an appropriate reply word. Assuming that an L is detected, the routine takes the affirmative exit from decision block 102 and enters decision block 103 where the seventh character of the word is inspected. Should the seventh character comprise a question mark, which establishes that an interrogation word has been received, the MPU calls up from memory the control setting which it is currently using for variable attenuator 75 and transmits an appropriate reply word which includes that setting.

Should the question mark be absent from the seventh character position of the received word, indicating the reception of an adjustment or lock word, the routine takes the negative exit from decision block 103 and enters decision block 104 where it decodes the seventh character position. The seventh character position indicates to the MPU the action which it must take relative to the control setting it provides to the variable attenuator. In the preferred embodiment, detection of a 9 in the seventh position causes the MPU to increase the variable attenuator setting by a single step of 4 dB, to temporarily store the new value and to transmit a reply word which contains the setting. In the preferred embodiment, upon the decoding of an 8 in the seventh position, the MPU reduces the variable attenuator setting by one step of 4 dB, stores the value, and transmits an appropriate reply word. When, in the preferred embodiment, a 7 is detected in the seventh character position, the MPU interprets this as a command to maintain the present value of the variable attenuator setting, to store the value, and to transmit an appropriate reply word.

Returning to decision block 100, in the event that a word framing character is not detected within the time required for transmission of another word from the master terminal 16, a system protection subroutine, illustrated in FIG. 9, is undertaken through the negative exit from decision block 100 in FIG. 8 to protect system communications if the polling signal is interrupted or degraded. The system protection routine causes the remote terminal to reduce the attenuation setting of the variable attenuator thereby increasing the level of the reply signal transmitted by the remote terminal in an effort to stimulate the master terminal to resume its polling routine which may have been interrupted. To this end, when the MPU routine takes the negative exit from decision block 100, it tests the quality of the other signals it is receiving, if any. Thus, the routine first tests the output of the comparator 77 in decision block 110 to determine whether the received signal level is above or below threshold. Assuming the signal is above threshold, the subroutine analyzes the structure of the received polling word to ensure that it has the proper format which can be done, for example, with a parity check or a check of the total number of characters contained in the word. Assuming the message is structurally correct, the routine reenters the remote terminal control routine of FIG. 8 through program step 111. Should the received signal level be insufficient or the message improper, the routine illustrated in FIG. 9 waits for a period of time during which, if an intelligible framing character is decoded, the routine is exited through program step 111. If the time-out period elapses without detection of an intelligible framing bit, the current setting of the variable attenuator will be inspected and, if it is at the minimum value, it will be changed to a predetermined value in the middle of the range of settings, after which the remote terminal will cease all functions to await the detection of an intelligible framing character. Should the variable attenuator not be set at its lowest level, the routine provides for lowering the level by one step of 4 db, reentering the time-out box, and awaiting the required amount of time. Once the lowest level of attenuation is reached, corresponding to the highest received signal level, the MPU returns the remote terminal to its predetermined wait value and waits for the detection of an intelligible framing character. In this manner, should communications with the master terminal be restored, the transmission levels of the remote terminals will not be so high as to saturate the receiver of the head-end modem, nor so low as to be marginally intelligible.

Although a variety of different devices might be utilized to implement circuitry or electronic assemblies disclosed herein, or variations thereof, some specific devices which will work in the afore-described preferred embodiment are listed in Table II hereof.

TABLE II

| Circuit or Assembly | Device |
| --- | --- |
| Master Terminal 16 | Digital Equipment Corporation DEC 325 Data System |
| CATV Line Amplifiers 30, 32, 34 | GTE Model 2000 Series |
| Passive subscriber line couplers 35, 36, 37 | RMS "UNITAP"$_R$ Series |
| Passive directional couplers 44, 45 | Jerrold "DC" Series |
| Modem MPU 56 and UART 55 | INTEL 8051 |
| Remote Terminal MPU 73 and UART 72 | INTEL 8051 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A remote terminal level measurement system for use in a multi-terminal communications system for bi-directional transmission of signals over a communications network having a head end for transmitting outgoing signals and receiving reply signals from a plurality of remote terminals, comprising:
    (a) identifier means at said head end for identifying outgoing signals each associated with a specific remote terminal;
    (b) reply means at each remote terminal and responsive to said outgoing signals from said head end, for identifying an outgoing signal associated with its respective remote terminal and transmitting a reply signal to said head end;
    (c) timer means at said head end for determining the period of time that should pass following the identification of an outgoing signal by said identifier means after which a reply signal from a specific remote terminal will be received at said head end;
    (d) measurement means at said head end and responsive to said timer means, for measuring at said head end the analog reply signal level at the end of said period of time; and
    (e) memory means at said head end for storing the measurement of said reply signal level for access at a later time.

2. The measurement system of claim 1 wherein said measurement means includes sample and hold circuit means for sampling the analog level of said reply signal and holding the sampled level until cleared.

3. A method for measurement of the transmission output level of a remote terminal in a communications system in which a plurality of remote terminals are connected through a head end to a master terminal by a communications network for bi-directional transmission of signals between said master terminal and said remote terminals, the method comprising the steps of:
    (a) identifying at said head end outgoing signals transmitted by said master terminal, each associated with a specific remote terminal;
    (b) at the head end, determining a predetermined time period following the identification of said outgoing signal, corresponding to the time required for a reply signal from said specific remote terminal to be received at said head end;
    (c) in response to the end of said predetermined time period, measuring at said head end the analog level of said reply signal; and
    (d) storing the measurement of the level of said reply signal for access at a later time.

* * * * *